United States Patent
Bai et al.

(10) Patent No.: US 9,320,014 B2
(45) Date of Patent: Apr. 19, 2016

(54) METHOD AND BASE STATION FOR ELIMINATING PAGING INTERFERENCE IN HETEROGENEOUS NETWORK

(71) Applicant: Huawei Technologies Co., Ltd., Shenzhen (CN)

(72) Inventors: Wei Bai, Beijing (CN); Zheng Yu, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 451 days.

(21) Appl. No.: 13/837,312

(22) Filed: Mar. 15, 2013

(65) Prior Publication Data
US 2013/0201919 A1  Aug. 8, 2013

Related U.S. Application Data (63) Continuation of application No. PCT/CN2011/075349, filed on Jun. 3, 2011.

(30) Foreign Application Priority Data

Sep. 15, 2010 (CN) .......................... 2010 1 0285683

(51) Int. Cl.
*H04W 4/00* (2009.01)
*H04W 68/02* (2009.01)
*H04W 72/08* (2009.01)

(52) U.S. Cl.
CPC ............ *H04W 68/02* (2013.01); *H04W 72/082* (2013.01)

(58) Field of Classification Search
CPC .................................................... H04W 68/02
USPC ............. 370/310–350; 455/422.1, 423, 67.13
See application file for complete search history.

(56) References Cited

U.S. PATENT DOCUMENTS

| | | | |
|---|---|---|---|
| 2009/0310503 A1* | 12/2009 | Tenny et al. | 370/252 |
| 2010/0248752 A1 | 9/2010 | Yu | |
| 2010/0323610 A1* | 12/2010 | Li et al. | 455/3.01 |

FOREIGN PATENT DOCUMENTS

| | | |
|---|---|---|
| CN | 101453788 A | 6/2009 |
| WO | WO 2009158544 A2 | 12/2009 |

OTHER PUBLICATIONS

Catt, "Interference coordination for DL CCH Considering legacy UE" Agenda Item 6.8, 3GPP TSG RAN WG1 meeting #60bis. Beijing, China, Apr. 12-16, 2010, 6 pages.

(Continued)

*Primary Examiner* — Ricky Ngo
*Assistant Examiner* — Wei-Po Kao
(74) *Attorney, Agent, or Firm* — Brinks Gilson & Lione (57) ABSTRACT

Embodiments of the present invention disclose a method and a base station for eliminating paging interference in a heterogeneous network. The method for eliminating paging interference includes: receiving, by a first base station, a paging parameter nB sent by a second base station; calculating, by the first base station according to the paging parameter nB of the second base station, a subframe for the second base station to send paging information and a paging frame to which the subframe belongs; obtaining, by the first base station, a set period; sending, by the first base station, paging information on the subframe in the paging frame within the set period; and stopping, by the first base station, information on the subframe in the paging frame within a next set period. Embodiments of the present invention are capable of reducing paging interference in a heterogeneous network.

11 Claims, 5 Drawing Sheets

(56) References Cited

OTHER PUBLICATIONS

Huawei and HiSilicon, "Interference coordination for common channels in HetNet" Agenda Item 6.8.1, 3GPP TSG RAN WG1 meeting #63. Jacksonville, USA, Nov. 15-19, 2010, 6 pages.

Xu, "LS on eICIC progress on RAN1" Draft, TSG-RAN1, Rel-10, 3GPP TSG-WG1 #62. Madrid, Spain, Aug. 23-27, 2010, 2 pages.

Qualcomm Inc., "Improving control reliability in severe interference conditions" Agenda Items 6.8.1, 3GPP TSG-RAN WG1 #61bis. Dresden, Germany, Jun. 28-Jul. 2, 2010, 4 pages.

Harman, "LTE Paging Process" Ericsson, Version PA1, Oct. 30, 2008, 44 pages.

Written Opinion of the International Searching Authority issued in corresponding PCT Patent Application No. PCT/CN2011/075349, mailed Sep. 15, 2011.

International Search Report issued in corresponding PCT Patent Application No. PCT/CN2011/075349, mailed Sep. 15, 2011.

Texas Instruments, "HeNB Power Control and Radio Link Monitoring Aspects" Agenda Item 6.8.1, 3GPP TSG RAN WG1 #62. Madrid, Spain, Aug. 23-27, 2010. R1-104484.

\* cited by examiner

METHOD AND BASE STATION FOR ELIMINATING PAGING INTERFERENCE IN HETEROGENEOUS NETWORK

CROSS-REFERENCE TO RELATED APPLICATIONS

This application is a continuation of International Application No. PCT/CN2011/075349, filed on Jun. 3, 2011, which claims priority to Chinese Patent Application No. 201010285683.1, filed on Sep. 15, 2010, both of which are hereby incorporated by reference in their entireties.

FIELD OF THE INVENTION

The present invention relates to the field of communication technologies, and in particular, to a method and a base station for eliminating paging interference in a heterogeneous network.

BACKGROUND OF THE INVENTION

Figure 1:
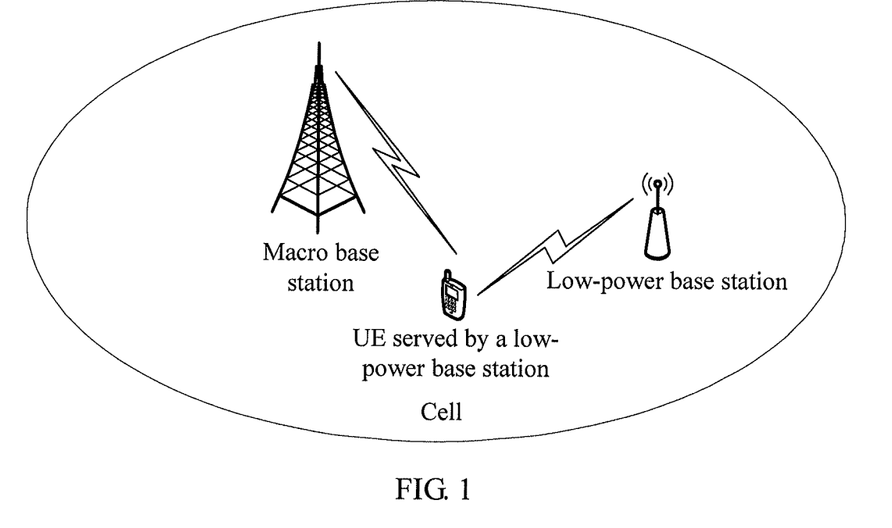
FIG. 1 is a schematic diagram of a scenario of paging interference between a macro base station and a low-power base station in the prior art.

In a long term evolution (Long term evolution, LTE) wireless communication system, a macro base station and a low-power base station may both be deployed in the same network cell. This network is referred to as a heterogeneous network (Heterogeneous Network, HN). The low-power base station may include, but is not limited to, a micro base station, a picocell, a femtocell, and a relay station. The low-power base station may be configured to cover a hotspot area of a cell, the interior of a room, a blind area, or edges of a cell, which may improve the average throughput of a cell, the edge throughput of a cell, and the like. In a heterogeneous network, in order to improve the utilization efficiency of the frequency spectrum of the system as much as possible, normally the macro base station and the low-power base station may configure the same frequency spectrum resources, which is prone to mutual interference between the macro base station and the low-power base station. As shown in FIG. 1, the macro base station (an interfering base station) may cause paging interference to a user equipment (User equipment, UE) served by the low-power base station (a service base station). Similarly, the low-power base station (an interfering base station) may also cause paging interference to a UE served by the macro base station (a service base station).

In the prior art, paging is implemented by using a physical downlink control channel (Physical downlink control channel, PDCCH) and a physical downlink sharing channel (Physical downlink sharing channel, PDSCH). Scrambling is performed on the PDCCH by using a paging-radio network temporary identifier (Paging-Radio network temporary identifier, P-RNTI), and paging information is borne over the PDSCH and is transmitted on one or more subframes of subframes 0, 1, 5, and 6 of each radio frame.

In practice, the inventor finds that no specific solution is available for eliminating interference in a paging process in an LTE system.

SUMMARY OF THE INVENTION

In embodiments of the present invention, a method and a base station for eliminating paging interference in a heterogeneous network are provided, which may reduce paging interference in a heterogeneous network.

A method for eliminating paging interference in a heterogeneous network includes:

receiving, by a first base station, a paging parameter nB sent by a second base station;

calculating, by the first base station according to the nB, a subframe for the second base station to send paging information and a paging frame to which the subframe belongs;

obtaining, by the first base station, a set period; and within the set period, sending, by the first base station, paging information on the subframe in the paging frame; and within a next set period, stopping, by the first base station, sending information on the subframe in the paging frame.

A base station includes:

a receiving module, configured to receive a paging parameter nB sent by a second base station;

a calculating module, configured to calculate, according to the nB received by the receiving module, a subframe for the second base station to send paging information and a paging frame to which the subframe belongs;

an obtaining module, configured to obtain a set period; and a sending module, configured to send, within the set period obtained by the obtaining module, paging information on the subframe in the paging frame calculated by the calculating module, and within a next set period, stop sending information on the subframe of the paging frame.

In embodiments of the present invention, a first base station receives a paging parameter nB sent by a second base station, and calculates, according to the paging parameter nB, a subframe for the second base station to send paging information and a paging frame to which the subframe belongs, so that the first base station may send paging information on the calculated subframe of the paging frame within a set period, and stop sending information on the calculated subframe of the paging frame within a next set period, thereby avoiding, under the circumstance that paging performance of the first base station is satisfied, using the calculated subframe and the calculated paging frame to which the subframe belongs to send messages, so as to reduce paging interference in a heterogeneous network.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 2:
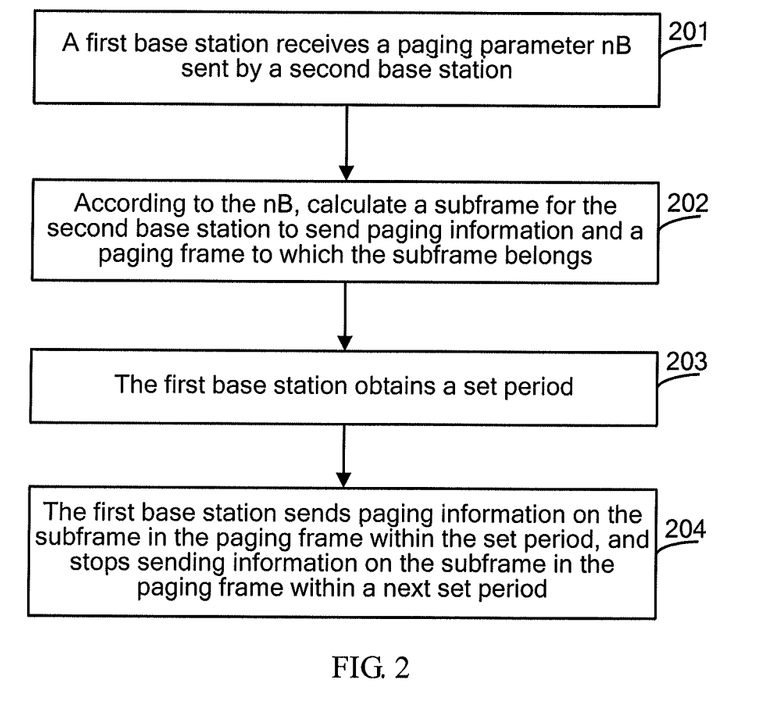
FIG. 2 is a schematic flowchart of a method for eliminating paging interference in a heterogeneous network according to an embodiment of the present invention.

As shown in FIG. 2, FIG. 2 is a schematic flowchart of a method for eliminating paging interference in a heterogeneous network according to an embodiment of the present invention. The method may include the following steps.

201. A first base station receives a paging parameter nB sent by a second base station.

In an embodiment of the present invention, the first base station and the second base station are base stations located in a heterogeneous network, where the coverage of the first base station overlaps the coverage of the second base station, and frequency spectrum resources configured by the first base station are fully or partially the same as frequency spectrum resources configured by the second base station.

In an embodiment of the present invention, the first base station may be a macro base station, and the second base station may be a low-power base station such as a micro base station, a picocell, a femtocell, and a relay station; or the first base station may be a low-power base station such as a micro base station, a picocell, a femtocell, and a relay station, and the second base station is a macro base station. The embodiment of the present invention sets no limitation thereto.

In the embodiment of the present invention, the first base station may receive a paging parameter nB sent by the second base station, where the paging parameter nB is sent by the second base station to the first base station through an interface between the second base station and the first base station. Or, the first base station may also actively request the paging parameter nB configured by the second base station from the second base station through the interface between the first base station and the second base station or through another dedicated channel. The interface in the embodiment includes a wired interface and a wireless interface. The embodiment of the present invention sets no limitation thereto.

In the embodiment of the present invention, the paging parameter nB of the second base station is configured in the second base station in advance. A value range of the paging parameter nB that is configured in advance in the second base station may be {4T, 2T, T, T/2, T/4, T/8, T/16, T/32}, where T represents an actual paging period of a user equipment served by the second base station, and a value range of T may be {32, 64, 128, 256} where the unit is frame.

In an LTE wireless communication system, each UE has a specific paging period $T_s$, where a value range of $T_s$ is {32, 64, 128, 256} and the unit is frame. Meanwhile, each base station may broadcast a discontinuous reception (Discontinuous Reception, DRX) period $T_c$ to a UE served by the base station, where a value range of $T_c$ may be {32, 64, 128, 256} and the unit is frame. Therefore, an actual paging period T of a UE is specifically a minimum value between a broadcasted DRX period $T_c$ and a specific paging period $T_s$. In other words, an actual paging period T of a UE served by the second base station is specifically a minimum value between a DRX period $T_c$ of the second base station and a specific paging period $T_s$ of the UE served by the second base station.

For example, if a value of a DRX period $T_c$ broadcasted by the second base station is 32 frames, and a value of a specific paging period $T_s$ of a UE served by the second base station is 64 frames, an actual paging period T of the UE is a minimum value between 64 frames and 32 frames, that is, T=32 frames. For another example, if a value of a DRX period $T_c$ broadcasted by the second base station is 128 frames, and a value of a specific paging period $T_s$ of a UE served by the second base station is 64 frames, an actual paging period T of the UE is a minimum value between 128 frames and 64 frames, that is, T=64 frames. It can be seen that the actual paging period of the UE served by the second base station $T<=T_c$.

With regard to the first base station, a paging parameter nB also needs to be configured in advance, so that the first base station may page a UE served by the first base station. Meanwhile, the first base station also needs to broadcast a DRX period $T_c$ to a UE served by the first base station, so that the UE served by the first base station may determine its own actual paging period according to a specific paging period $T_s$. A value range of the paging parameter nB configured in advance by the first base station is the same as the value range of the paging parameter nB configured in advance by the second base station, and the value range of $T_c$ of the first base station is also the same as the value range of $T_c$ of the second base station.

202. Calculate, according to the nB, a subframe for the second base station to send paging information and a paging frame to which the subframe belongs.

In an LTE wireless communication system, a base station sends paging information by using a subframe and a paging frame to which the subframe belongs. A UE uses a P-RNTI to monitor a PDCCH, where the P-RNTI is required for scrambling on the PDCCH. In this way, the UE may subsequently descramble a monitored PDCCH by using the P-RNTI, read a PDSCH scheduled and indicated by the PDCCH after correctly descrambling the PDCCH, obtain relevant data (which mainly is UE_ID) from the PDSCH, and transfer it to a media access control layer through a paging channel (Paging Channel, PCH), thereby implementing paging the UE by the base station.

In the embodiment of the present invention, the first base station may calculate, according to the nB configured in advance by the second base station, a paging opportunity i_s for the second base station to send paging information, and then determine, according to the paging opportunity i_s, a subframe for the second base station to send the paging information. The specific implementation scheme is as follows.

(1) Calculate a paging opportunity i_s for the second base station to send paging information, according to the following formula (1):

$$i\_s = \text{floor}(UE\_ID/N) \bmod N_s \qquad (1)$$

where floor (*) represents integer rounding, that is, represents an integer of a quotient of UE_ID/N; UE_ID represents an equivalent identifier of a UE served by a second base station; N is a minimum value between T and nB configured in advance by the second base station, where T represents an actual paging period of the UE served by the second base station; $N_s$ is a maximum value between 1 and nB/T; and mod represents a modulo operation.

(2) Obtain a subframe for the second base station to send the paging information from stored correspondence between i_s and the subframebetween i_s and the subframe according to the calculated i_s.

In the embodiment of the present invention, after calculating the paging opportunity i_s for the second base station to send the paging information, the first base station may obtain a subframe for the second base station to send the paging information from correspondence between i_s and the subframebetween i_s and the subframe shown in table 1, where the table corresponds to an LTE TDD system. In an LTE FDD system, subframe 1 should be changed into subframe 4, and subframe 6 should be changed into subframe 9.

TABLE 1

Correspondence between i_s and the subframe

| $N_s$ | i_s = 0 | i_s = 1 | i_s = 2 | i_s = 3 |
|---|---|---|---|---|
| 1 | Subframe 0 | N/A | N/A | N/A |
| 2 | Subframe 0 | Subframe 5 | N/A | N/A |
| 4 | Subframe 0 | Subframe 1 | Subframe 5 | Subframe 6 |

For example, when a value of nB is T, Ns is a maximum value between 1 and nB/T, that is, the value of Ns is 1. After Ns=1 is substituted into the above formula (1), a result of modulo 1 by any number is 0. That is, i_s=0. According to table 1, the subframe for the second base station to send the paging information may specifically be subframe 0. When the value of nB is 2T, Ns is a maximum value between 1 and nB/T, that is, the value of Ns is 2. After Ns=2 is substituted into the above formula (1), a result of modulo 2 by any number may be 0 or 1. That is, i_s=0 or 1. According to table 1, the subframe for the second base station to send the paging information may specifically be subframe 0 and subframe 5.

In the embodiment of the present invention, the first base station may calculate the paging frame for the second base station to send the paging information, according to the nB configured in advance by the second base station. In an LTE wireless TDD communication system, each paging frame includes 10 subframes, where each paging frame may use one or more subframes of subframe 0, subframe 1, subframe 5, and subframe 6 to send paging information. Calculating, by the first base station, the paging frame to which the subframe for the second base station to send the paging information belongs according to the nB configured in advance by the second base station specifically is:

calculating a paging frame SFN to which the subframe for the second base station to send the paging information belongs, according to the following formula (2):

$$SFN \bmod T = (T/N) \times (UE\_ID \bmod N) \quad (2)$$

where SFN represents a frame number of the paging frame to which the subframe for the second base station to send the paging information belongs, T represents an actual paging period of a UE served by the second base station, UE_ID represent an equivalent identifier of the UE served by the second base station, and N is a minimum value between T and an nB configured in advance by the second base station.

For example, if a value of nB of the second base station is T, and N is a minimum value between T and nB, that is N=T; after N=T is substituted into the above formula (2), the above formula (2) is changed into a formula (3):

$$SFN \bmod T = UE\_ID \bmod T \quad (3)$$

Equivalent identifiers UE_ID of different UEs are different. Therefore, an equivalent identifier UE_ID may be deemed as a variable. It can be seen from the above formula (3), the paging frame SFN must include all paging frames in a resource so that the second base station supports paging all UEs. That is, a set of paging frames to which the subframe, calculated by the first base station, for the second base station to send the paging information belongs is all paging frames.

For another example, if a value of nB is T/2, and N is a minimum value between T and nB, that is N=T/2; after N=T/2 is substituted into the above formula (2), the above formula (2) is changed into a formula (4):

$$SFN \bmod T = 2 \times UE\_ID \bmod T/2 \quad (4)$$

It can be seen from the above formula (4), a set of paging frames to which the subframe, calculated by the first base station, for the second base station to send the paging information belongs is all even frames.

For another example, if a value of nB is T/4, and N is a minimum value between T and nB, that is N=T/4; after N=T/4 is substituted into the above formula (2), the above formula (2) is changed into a formula (5):

$$SFN \bmod T = 4 \times UE\_ID \bmod T/4 \quad (5)$$

It can be seen from the above formula (5), a set of paging frames to which the subframe, calculated by the first base station, for the second base station to send the paging information belongs is paging frames whose SFNs are equal to an integer multiple of 4.

203. The first base station obtains a set period.

In the embodiment of the present invention, the first base station may receive a broadcast DRX period $T_c$ sent by the second base station, where the broadcast DRX period $T_c$ is sent by the second base station to the first base station through an interface between the second base station and the first base station. Or, the first base station may also actively request the broadcast DRX period $T_c$ configured by the second base station from the second base station through the interface between the first base station and the second base station or through another dedicated channel. After receiving the broadcast DRX period $T_c$ sent by the second base station, the first base station may select a maximum value between the broadcast DRX period $T_c$ of the second base station and a maximum value of actual paging periods of all user equipments served by the first base station as a set period TΔ.

For example, if the broadcast DRX period $T_c$ of the second base station is 64 frames, and a maximum value of actual paging periods of all UEs served by the first base station is 32 frames, a value of TΔ is a maximum value between 64 frames and 32 frames, that is, TΔ=64 frames.

In the embodiment of the present invention, the first base station may obtain the broadcast DRX period $T_c$ of the second base station from a local memory, and select a maximum value between the broadcast DRX period $T_c$ of the second base station and a maximum value of actual paging periods of all user equipments served by the first base station as a set period TΔ.

For example, when deploying a base station, a carrier may write broadcast DRX periods $T_c$ of other base stations around the base station into the local memory of the base station, so that the base station may obtain a broadcast DRX period $T_c$ of one of the base stations from the local memory during operation, compare the obtained broadcast DRX period $T_c$ with a maximum value of actual paging periods of all user equipments served by the base station, and select a maximum value between the two as a set period TΔ.

In addition, in the embodiment of the present invention, the first base station may further select a broadcast DRX period $T_c$ configured by the first base station as a set period TΔ.

In this embodiment of the present invention, the first base station selects a maximum value between the $T_c$ of the second base station and a maximum value of actual paging periods of all user equipments served by the first base station as a sub-period TΔ, which may ensure that the sub-period TΔ may be greater than or equal to actual paging periods of all UEs served by the first base station and the second base station.

204. The first base station sends paging information on the subframe in the paging frame within the set period, and stops sending information on the subframe in the paging frame within a next set period.

In the embodiment of the present invention, information that is no longer sent on the subframe in the paging frame includes paging information and/or data information.

In the embodiment of the present invention, the first base station may select at least two set periods TΔs to form a macro period. The first base station may send paging information within one or more set periods TΔs of the macro period, and within the remaining set periods TΔs, stops sending information through the subframe of the second base station and the paging frame to which the subframe belongs, so that the first base station may reduce paging interference to UEs served by the second base station, without affecting paging performance of the first base station itself.

In the embodiment of the present invention, a first base station receives a paging parameter nB sent by a second base station, and according to the paging parameter nB, calculates a subframe for the second base station to send paging information and a paging frame to which the subframe belongs, so that the first base station may send paging information on the subframe of the calculated paging frame within a set period, and stop sending information on the subframe of the calculated paging frame within a next set period, thereby avoiding, under the circumstance that paging performance of the first base station is satisfied, using the calculated subframe and the calculated paging frame to which the subframe belongs to send messages, so as to reduce paging interference in a heterogeneous network.

To better understand the embodiments of the present invention, the following embodiments are described in detail.

Embodiment 1

Figure 3:
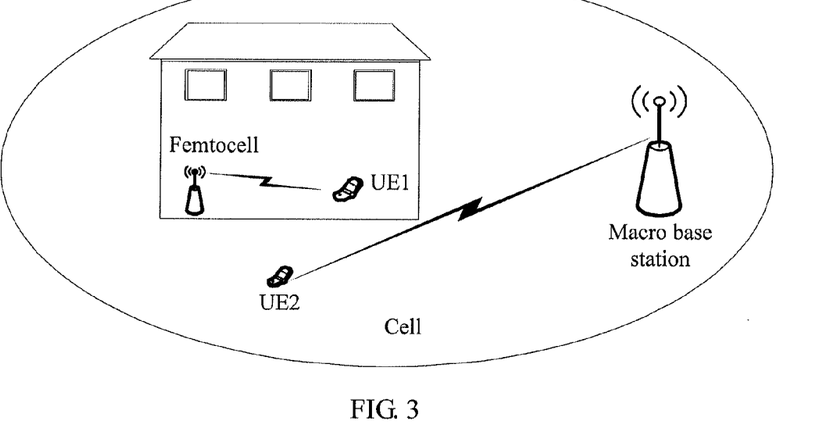
FIG. 3 is a schematic diagram of a scenario of paging interference between a macro base station and a femtocell according to an embodiment of the present invention.

As shown in FIG. 3, FIG. 3 is a schematic diagram of a scenario of paging interference between a macro base station and a femtocell according to Embodiment 1 of the present invention.

As shown in FIG. 3, there is both a macro base station and a femtocell in a heterogeneous network. A user equipment served by the macro base station is UE 2, and a user equipment served by the femtocell is UE 1. When the UE 2 moves to an overlapping area of the macro base station and the femtocell (an area where the coverage of the macro base station and the coverage of the femtocell overlap), the femtocell may cause paging interference to the UE 2.

Assuming that the macro base station configures a paging parameter nB=T and a broadcast DRX period=$T_c$, the macro base station sends the paging parameter nB=T and the broadcast DRX period=$T_c$ to the femtocell through an interface between the macro base station and the femtocell. After receiving the paging parameter nB sent by the macro base station, the femtocell obtains N=T (where N is a minimum value between T and nB), and substitutes N=T into the above formula (2) to calculate that a paging frame set of the macro base station is all frames, and further substitutes $N_s$=1 (where $N_s$ is a maximum value between 1 and nB/T) and N=T into the formula (1) to calculate that a paging opportunity for the macro base station to send paging information is 0. Then, according to table 1, subframes for the macro base station to send the paging information are all subframe 0.

Assuming that the femtocell configures a value of a paging parameter nB to be T/2, the femtocell substitutes N=T/2 into the above formula (2) to obtain that a paging frame set of the femtocell is all even frames, and further substitutes $N_s$=1 (where $N_s$ is a maximum value between 1 and nB/T) and N=T/2 into the formula (1) to calculate that a paging opportunity for the femtocell to send paging information is also 0. Then, according to table 1, subframes for the femtocell to send paging information are all subframe 0.

Figure 4:
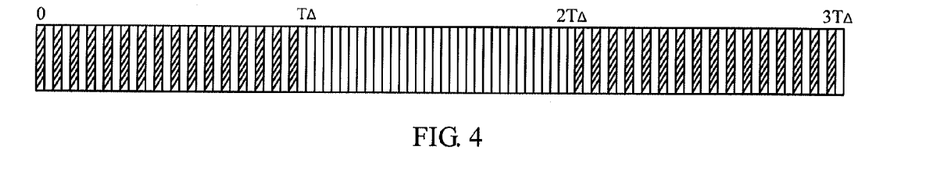
FIG. 4 is a schematic diagram of a paging location of a femtocell according to an embodiment of the present invention.

Meanwhile, the femtocell selects a maximum value between a broadcast DRX period $T_c$ of a macro base station and a maximum value of actual paging periods of all UEs served by the femtocell as a set period TΔ. For example, the femtocell may select 2 set periods TΔs to form a macro period, so that the femtocell sends paging information only on subframe 0 of all even frames normally within 0-TΔ, but does not send paging information on subframe 0 of odd frames; and the femtocell stops sending paging information on the subframe 0 of all paging frames (including even frames and odd frames) within TΔ-2TΔ. As shown in FIG. 4, subframes with inclined lines indicate sending paging information, and blank subframes indicate stopping sending paging information.

Embodiment 2

Figure 5:
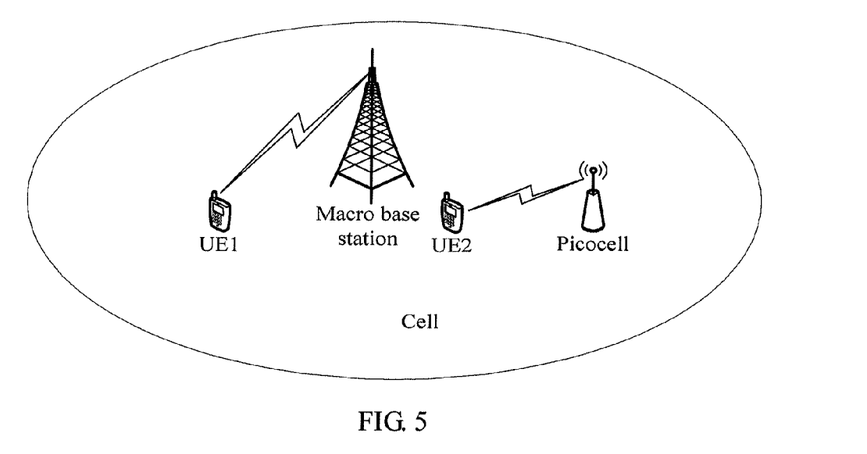
FIG. 5 is a schematic diagram of a scenario of paging interference between a macro base station and a picocell according to an embodiment of the present invention.
Figure 6:
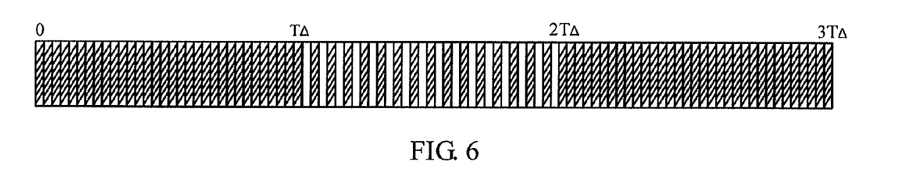
FIG. 6 is a schematic diagram of a paging location of a macro base station according to an embodiment of the present invention.

As shown in FIG. 5, FIG. 5 is a schematic diagram of a scenario of paging interference between a macro base station and a picocell according to Embodiment 2 of the present invention.

As shown in FIG. 5, there is both a macro base station and a picocell in a heterogeneous network. A user equipment served by the macro base station is UE 2, and a user equipment served by the picocell is UE 1. When the UE 1 moves to an overlapping area of the macro base station and the picocell (an area where the coverage of the macro base station and the coverage of the picocell overlap), the macro base station may cause paging interference to the UE 1.

Assuming that the picocell configures a paging parameter nB=T/2 and a broadcast DRX period=$T_c$, the picocell sends the paging parameter nB=T/2 and the broadcast DRX period=$T_c$ to the macro base station through an interface between the picocell and the macro base station. After receiving the paging parameter nB sent by the picocell, the macro base station obtains N=T/2 (where N is a minimum value between T and nB), and substitutes N=T/2 into the above formula (2) to calculate that a paging frame set of the picocell is all even frames, and further substitutes $N_s$=1 (where $N_s$ is a maximum value between 1 and nB/T) and N=T/2 into the formula (1) to calculate that paging opportunities for the picocell to send paging information are all 0. Then, according to table 1, subframes for the picocell to send the paging information are all subframe 0.

Assuming that the macro base station configures a value of a paging parameter nB to be 2T, the macro base station substitutes N=T into the above formula (2) to obtain that a paging frame set of the macro base station is all frames, and further substitutes $N_s$=2 (where $N_s$ is a maximum value between 1 and nB/T) and N=T into the formula (1) to calculate that paging opportunities for the macro base station to send paging information are 0 and 1. According to the table 1, subframes for the macro base station to send paging information are subframe 0 and subframe 5.

Meanwhile, the macro base station selects a maximum value between a broadcast DRX period=$T_c$ of the picocell and a maximum value of actual paging periods of all UEs served by the picocell as a set period TΔ. For example, the macro base station may select 2 set periods TΔs to form a macro period, so that the macro base station normally sends paging information on subframe 0 and subframe 5 of all frames (including even frames and odd frames) within 0-TΔ. Within TΔ-2TΔ, the macro base station sends paging information only on subframe 0 and subframe 5 of odd frames and stops sending paging information on subframe 0 of even frames; meanwhile, in order to prevent the macro base station from causing interference to a system information block 1 (SIB1) to which the picocell belongs, the macro base station may stop sending paging information on subframe 5 of even frames. As shown in FIG. 5, subframes with inclined lines indicate sending paging information, and blank subframes indicate stopping sending paging information.

Embodiment 3

Similarly, as shown in FIG. 5, assuming that the picocell configures a value of a paging parameter nB to be T/2, the picocell sends the paging parameter nB=T/2 to a macro base station through an interface between the picocell and the macro base station. After receiving the paging parameter nB sent by the picocell, the macro base station obtains N=T/2 (where N is a minimum value between T and nB), and substitutes N=T/2 into the above formula (2) to calculate that a paging frame set of the picocell is all even frames, and further substitutes $N_s$=1 (where $N_s$ is a maximum value between 1 and nB/T) and N=T/2 into the formula (1) to calculate that paging opportunities for the picocell to send paging information are all 0. Then, according to table 1, subframes for the picocell to send the paging information are subframe 0.

Assuming that the macro base station configures a value of a paging parameter nB to be T/2, the macro base station substitutes N=T/2 into the above formula (2) to obtain that a paging frame set of the macro base station is all even frames, and further substitutes $N_s$=1 (where $N_s$ is a maximum value between 1 and nB/T) and N=T/2 into the formula (1) to calculate that a paging opportunity for the macro base station to send paging information is 0. According to the table 1, the subframe for the macro base station to send paging information is subframe 0.

Meanwhile, the macro base station selects a broadcast DRX period=$T_c$ configured by the macro base station itself as a set period TΔ. A frame timing relationship between the macro base station and the picocell is adjusted, to ensure that even frames of the macro base station and odd frames of the picocell are aligned at frame boundaries, and odd frames of the macro base station and even frames of the picocell are aligned at frame boundaries. For example, the macro base station may select 2 set periods TΔs to form a macro period, so that the macro base station normally sends paging information on subframe 0 of all even frames of the macro base station within 0-TΔ, and normally sends information such as data on subframe 0 of all odd frames of the macro base station. Within TΔ-2TΔ, the macro base station normally sends paging information on subframe 0 of all even frames of the macro base station, and stops sending any information on subframe 0 of all odd frames of the macro base station, so that paging interference may not be caused between the two.

In the embodiment of the present invention, a macro period may be formed by three or more set periods TΔs. The macro base station sends paging information on a part of the TΔs and stops sending information on a part of the TΔs, which may also reduce paging interference in a heterogeneous network.

Figure 7:
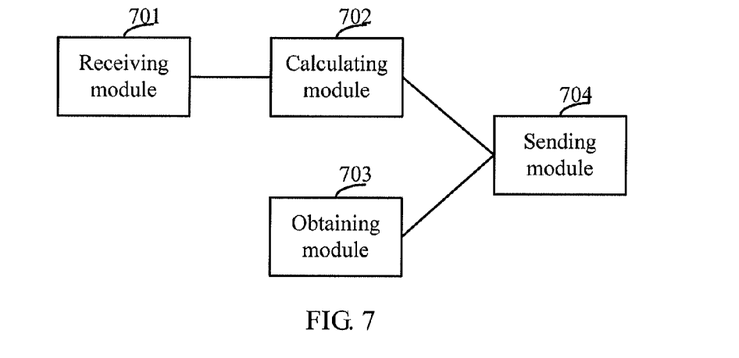
FIG. 7 is a schematic structural diagram of a base station according to an embodiment of the present invention.

As shown in FIG. 7, FIG. 7 is a schematic structural diagram of a base station according to an embodiment of the present invention, which is applied to a heterogeneous network. The base station may include:

a receiving module 701, configured to receive a paging parameter nB sent by a second base station;

where in the embodiment of the present invention, the coverage of the second base station overlaps the coverage of the base station, and frequency spectrum resources configured by the second base station are fully or partially the same as frequency spectrum resources configured by the base station;

a calculating module 702, configured to calculate, according to the nB, a subframe for the second base station to send paging information and a paging frame to which the subframe belongs;

an obtaining module 703, configured to obtain a set period; and a sending module 704, configured to send paging information on the subframe in the paging frame within the set period, and stop sending information on the subframe in the paging frame within a next set period.

In an LTE wireless communication system, a value range of the paging parameter nB is {4T, 2T, T, T/2, T/4, T/8, T/16, T/32}, where T represents an actual paging period of a UE served by the second base station.

Figure 8:
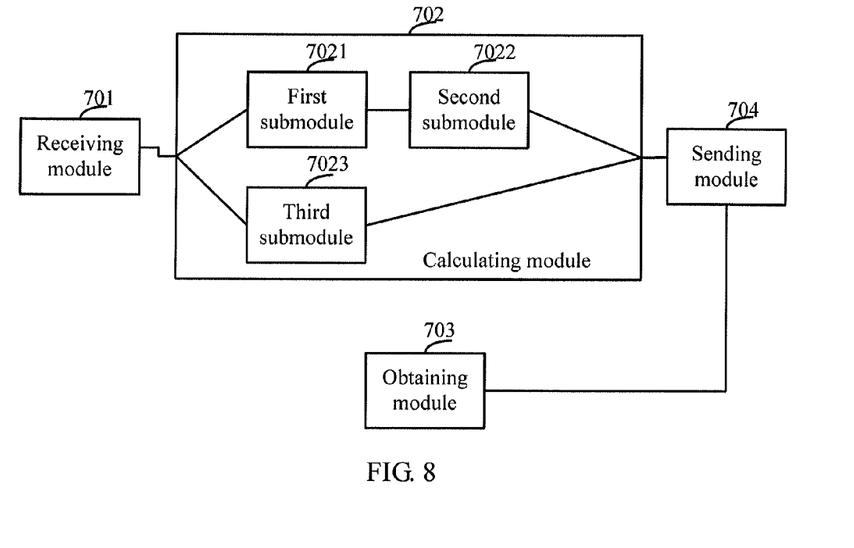
FIG. 8 is a schematic structural diagram of another base station according to an embodiment of the present invention.

As shown in FIG. 8, FIG. 8 is a schematic structural diagram of another base station according to an embodiment of the present invention, which is applied to a heterogeneous network. The base station shown in FIG. 8 is obtained by detailing the base station shown in FIG. 7, where the calculating module 702 may include:

a first submodule 7021, configured to calculate, according to the nB, a paging opportunity i_s for the second base station to send paging information, where i_s satisfies i_s=floor (UE_ID/N) mod $N_s$, where floor (*) represents integer rounding, UE_ID represents an equivalent identifier of a UE served by the second base station, N is a minimum value between T and nB, $N_s$ is a maximum value between 1 and nB/T, and mod represents modulo operation;

a second submodule 7022, configured to obtain a subframe for the second base station to send paging information from stored correspondence between i_s and the subframe according to the calculated i_s, and output it to the sending module 704; and a third submodule 7023, configured to calculate, according to the nB, a paging frame SFN to which the subframe for the second base station to send paging information belongs, and output it to the sending module 704, where SFN mod T=(T/N)×(UE_ID mod N).

Figure 9:
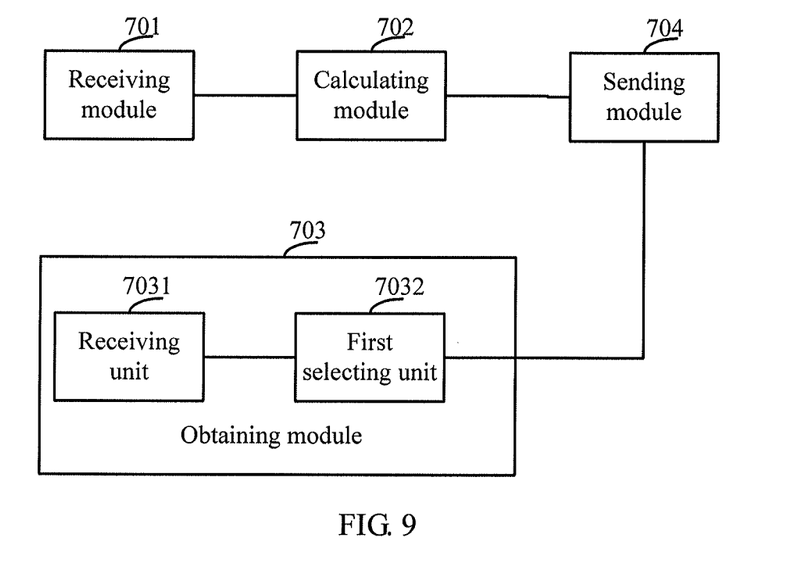
FIG. 9 is a schematic structural diagram of another base station according to an embodiment of the present invention.

As shown in FIG. 9, FIG. 9 is a schematic structural diagram of another base station according to an embodiment of the present invention, which is applied to a heterogeneous network. The base station shown in FIG. 9 is obtained by detailing the base station shown in FIG. 7, where the obtaining module 703 may include:

a receiving unit 7031, configured to receive a broadcast discontinuous reception DRX period $T_c$ sent by the second base station; and a first selecting unit 7032, configured to select a maximum value between the above $T_c$ and a maximum value of actual paging periods of all user equipments served by the base station as a set period, and output it to the sending module 704.

In the base station shown in FIG. 9, a structure of the calculating module 702 may be the same as a structure of the calculating module 702 in FIG. 8, and details are not repeated in the embodiment of the present invention.

Figure 10:
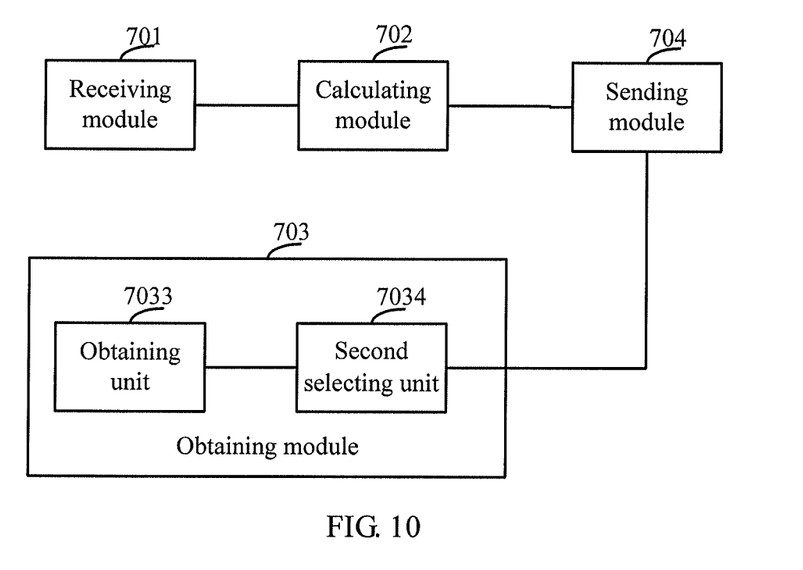
FIG. 10 is a schematic structural diagram of another base station according to an embodiment of the present invention.

As shown in FIG. 10, FIG. 10 is a schematic structural diagram of another base station according to an embodiment of the present invention, which is applied to a heterogeneous network. The base station shown in FIG. 10 is obtained by detailing the base station shown in FIG. 7, where the obtaining module 703 may include:

an obtaining unit 7033, configured to obtain a broadcast DRX period $T_c$ of the second base station from a local memory; and a second selecting unit 7034, configured to select a maximum value between the above $T_c$ and a maximum value of actual paging periods of all user equipments served by the base station as a set period.

In the base station shown in FIG. 10, a structure of the calculating module 702 may be the same as a structure of the calculating module 702 in FIG. 8, and details are not repeated in the embodiment of the present invention.

Figure 11:
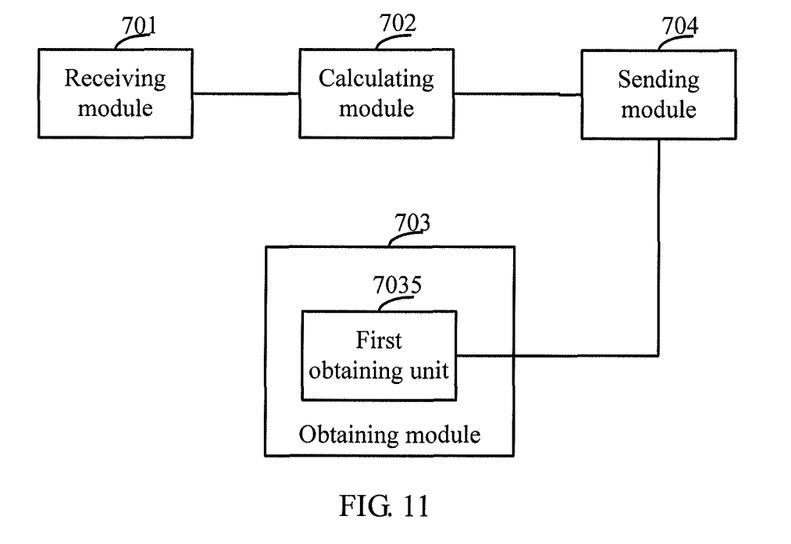
FIG. 11 is a schematic structural diagram of another base station according to an embodiment of the present invention.

As shown in FIG. 11, FIG. 11 is a schematic structural diagram of another base station according to an embodiment of the present invention, which is applied to a heterogeneous network. The base station shown in FIG. 11 is obtained by detailing the base station shown in FIG. 7, where the obtaining module 703 may include:

a first obtaining unit 7035, configured to set a set period as a broadcast discontinuous reception DRX period $T_c$ of the base station.

In the base station shown in FIG. 11, a structure of the calculating module 702 may be the same as a structure of the calculating module 702 in FIG. 8, and details are not repeated in the embodiment of the present invention.

In the embodiment of the present invention, a macro period may be formed by three or more set periods TΔ. The base station sends paging information on a part of the TΔs and stops sending information on a part of the TΔs, which may also reduce paging interference in a heterogeneous network.

In the embodiment of the present invention, a receiving module 701 receives a paging parameter nB sent by a second base station; a calculating module 702 calculates, according to the paging parameter nB, a subframe for the second base station to send paging information and a paging frame to which the subframe belongs, so that a sending module 704 may send paging information on the subframe of the calculated paging frame within a set period, and stop sending information on the subframe of the calculated paging frame within a next set period, thereby avoiding, under the circumstance that paging performance of a local base station is satisfied, using the calculated subframe and the calculated paging frame to which the subframe belongs to send messages, so as to reduce paging interference in a heterogeneous network.

Persons of ordinary skill in the art may understand that all or a part of the steps in the foregoing methods in the embodiments may be implemented by a program instructing relevant hardware. The program may be stored in a computer readable storage medium. When the program is run, the steps of the foregoing methods in the embodiments are performed. The storage medium includes any medium that can store program codes, such as a read-only memory (ROM), a random access memory (RAM), a magnetic disk, or an optical disk.

A method and an apparatus for eliminating paging interference in a heterogeneous network provided by the embodiments of the present invention are described in detail above. The principle and embodiments of the present invention are described by using specific examples herein. The above embodiments are described to help understand the method and core idea of the present invention. Meanwhile, variation may be made to the present invention in terms of the specific embodiments and application scope by persons of ordinary skill in the art based on the idea of the present invention. Therefore, the content of the specification shall not be construed as a limit to the present invention.

What is claimed is:

1. A method for eliminating paging interference in a heterogeneous network, comprising:

receiving, by a first base station, a paging parameter nB sent by a second base station;

calculating, by the first base station according to the nB, a subframe for the second base station to send paging information and a paging frame to which the subframe belongs;

obtaining, by the first base station, a set period; and within the set period, sending, by the first base station, the paging information on the subframe in the paging frame; and within a next set period, stopping, by the first base station, sending information on the subframe in the paging frame, wherein the calculating, by the first base station according to the nB, a subframe for the second base station to send paging information and a paging frame to which the subframe belongs comprises:

calculating, by the first base station according to the nB, a paging opportunity i_s for the second base station to send the paging information, wherein i_s satisfies i_s=floor (UE_ID/N) mod Ns, wherein floor (*) represents integer rounding, UE_ID represents an equivalent identifier of the user equipment served by the second base station, N is a minimum value between T and nB, Ns is a maximum value between 1 and nB/T, and mod represents a modulo operation;

obtaining the subframe for the second base station to send the paging information from stored correspondence between i_s and the subframe according to the calculated i_s; and calculating according to the nB a paging frame SFN to which the subframe for the second base station to send the paging information belongs, wherein the SFN satisfies SFN mod T=(T/N)×(UE_ID mod N).

2. The method according to claim 1, wherein a value range of the nB is {4T, 2T, T, T/2, T/4, T/8, T/16, T/32}, wherein T represents an actual paging period of a user equipment served by the second base station.

3. The method according to claim 1, wherein the obtaining, by the first base station, a set period comprises:

receiving, by the first base station, a broadcast discontinuous reception DRX period Tc sent by the second base station; and selecting a maximum value between the Tc and a maximum value of actual paging periods of all user equipments served by the first base station as the set period.

4. The method according to claim 1, wherein the obtaining, by the first base station, a set period comprises:

obtaining, by the first base station, a broadcast DRX period Tc of the second base station from a local memory; and selecting a maximum value between the Tc and a maximum value of actual paging periods of all user equipments served by the first base station as the set period.

5. The method according to claim 1, wherein the set period specifically is a broadcast discontinuous reception DRX period Tc of the first base station.

6. The method according to claim 1, wherein coverage of the first base station overlaps coverage of the second base station, and frequency spectrum resources configured by the first base station are fully or partially the same as frequency spectrum resources configured by the second base station.

7. A base station, comprising at least a processor which executes program codes stored in a memory to configure the base station to:
receive a paging parameter nB sent by a second base station;
calculate, according to the received nB, a subframe for the second base station to send paging information and a paging frame to which the subframe belongs;
obtain a set period; and
send, within the obtained set period, the paging information on the subframe in the paging frame, and within a next set period, stop sending information on the subframe of the paging frame,
wherein the calculating comprises:
calculate, according to the nB, a paging opportunity i_s for the second base station to send the paging information, wherein i_s satisfies i_s=floor (UE_ID /N) mod Ns, wherein floor (*) represents integer rounding, UE_ID represents an equivalent identifier of the user equipment served by the second base station, N is a minimum value between T and nB, Ns is a maximum value between 1 and nB/T, and mod represents a modulo operation;
obtain the subframe for the second base station to send the paging information from stored correspondence between i_s and the subframe according to the calculated i_s; and
calculate, according to the nB, a paging frame SFN to which the subframe for the second base station to send the paging information belongs, wherein the SFN satisfies SFN mod T=(T/N)×(UE_ID mod N).

8. The base station according to claim 7, wherein:
a value range of the nB is {4T, 2T, T, T/2, T/4, T/8, T/16, T/32}, wherein T represents an actual paging period of a user equipment served by the second base station.

9. The base station according to claim 7, wherein the base station is configured to:
receive a broadcast discontinuous reception DRX period Tc sent by the second base station; and
select a maximum value between the Tc and a maximum value of actual paging periods of all user equipments served by the base station as the set period.

10. The base station according to claim 7, wherein the base station is configured to:
obtain a broadcast DRX period Tc of the second base station from a local memory; and
select a maximum value between the Tc and a maximum value of actual paging periods of all user equipments served by the base station as the set period.

11. The base station according to claim 7, wherein the base station is configured to:
set the set period as a broadcast discontinuous reception DRX period Tc of the base station.

* * * * *